(12) United States Patent
Wurtz et al.

(10) Patent No.: US 10,078,145 B1
(45) Date of Patent: Sep. 18, 2018

(54) METHODS AND SYSTEMS FOR CALIBRATION OF PARTICLE DETECTORS

(71) Applicant: Lawrence Livermore National Security, LLC, Livermore, CA (US)

(72) Inventors: Ronald E. Wurtz, Oakland, CA (US); Kristin Lennox, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 15/693,373

(22) Filed: Aug. 31, 2017

(51) Int. Cl.
*G01T 7/00* (2006.01)

(52) U.S. Cl.
CPC .................... *G01T 7/005* (2013.01)

(58) Field of Classification Search
CPC ....................................... G01T 7/005
See application file for complete search history.

(56) References Cited

U.S. PATENT DOCUMENTS

2007/0246657 A1* 10/2007 Lewis .................. G01T 1/02
250/370.07

* cited by examiner

*Primary Examiner* — Mark R Gaworecki
(74) *Attorney, Agent, or Firm* — Perkins Coie LLP

(57) ABSTRACT

Techniques for calibration of particle detectors are disclosed. In one aspect, a system for calibrating a particle detector includes a source configured to emit particles including a first and a second type of particles; a first and a second shielding unit configured to be removably positioned in a travel path of the particles and configured to block at least a portion of the first type of particles and to allow the second type of particles to traverse substantially unimpeded therethrough; one or more particle detectors positioned in the travel path of the particles to receive particles after traversing through the first or the second shielding unit and produce electronic pulses in response to the detection of the particles; and a processor coupled to the one or more particle detectors to generate training date and a classifier that allows classification of the first and the second types of particles.

20 Claims, 7 Drawing Sheets

METHODS AND SYSTEMS FOR CALIBRATION OF PARTICLE DETECTORS

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This patent document generally relates to particle detection, and more particularly, methods and systems for calibrating one or more particle detectors.

BACKGROUND

In experimental and applied particle physics, nuclear physics, and nuclear engineering, a particle detector, also known as a radiation detector, is a device used to detect, track, and/or identify particles, such as those produced by nuclear decay, cosmic radiation, or reactions in a particle accelerator. Detectors can measure the particle energy and other attributes such as momentum, spin, charge, in addition to merely registering the presence of the particle.

SUMMARY OF PARTICULAR EMBODIMENTS

The present document discloses methods and systems for calibration of one or more particle detectors.

In one exemplary aspect, a system for calibrating a radiation detector is disclosed. The system includes a source configured to emit particles or rays including a first type of particles or rays and a second type of particles or rays; a first and a second shielding unit, the first shielding unit configured to be removably positioned at a first distance from the source in a travel path of the particles or rays that are emitted from the source and the second shielding unit configured to be removably positioned at a second distance from the source in the travel path of the particles or rays that are emitted from the source, each shielding unit configured to block at least a portion of the first type of particles or rays and to allow the second type of particles or rays to traverse substantially unimpeded therethrough; one or more detectors positioned in the travel path of the particles or rays to receive one or more particles or rays, wherein the one or more detectors are configured to detect the first type of particles or rays and the second type of particles or rays and to produce electronic pulses in response to the detection of the first and the second type of particles or rays; and a processor coupled to the one or more detectors, the processor further coupled to a memory including instructions executable by the processor, the instructions executable by the processor to configure the processor to receive (1) a first set of pulses from the one or more detectors corresponding to detections with the first and the second shielding units in place, (2) a second set of pulses from the one or more detectors corresponding to detections with the first shielding unit in place and with the second shielding unit removed, and (3) a third set of pulses from the one or more detectors corresponding to detections with both the first and the second shielding units removed, the processor further configured to store at least a first set of training pulses corresponding to the first type of particles or rays and a second set of training pulses corresponding to the second type of particles or rays, and to generate a classifier that allows classification of the first and the second types of particles or rays.

In some embodiments, the particles or rays include alpha particles, fast neutrons, thermal neutrons, or gamma rays. In some implementations, the first type of particles or rays includes gamma rays and the second type of particles or rays includes neutrons.

In some embodiments, the first and the second shielding units are lead blocks. The lead blocks can have a thickness of 2 inches. In some embodiments, the classifier is a Bayesian classifier. In some embodiments, the system includes 12 to 100 detectors. In some implementations, the source is configured to emit the particles or rays at a rate below a predetermined threshold to reduce overlapped accumulation of the electronic pulses corresponding to each type of particles or rays.

In another exemplary aspect, a method of calibrating a radiation detector is disclosed. The method includes obtaining a first set of data collected from one or more detectors positioned in a travel path of particles or rays emitted from a source, wherein the first set of data corresponds to detections associated with a first type of particles or rays and a second type of particles or rays; positioning a first shielding unit at a first distance from the source in the travel path of the particles or rays emitted from the source, wherein the first shielding unit is configured to block at least a portion of the first type of particles or rays and to allow the second type of particles or rays to traverse substantially unimpeded therethrough; obtaining a second set of data collected from the one or more detectors, wherein the second set of data corresponds to detections by the one or more detectors with the first shielding unit in place; positioning a second shielding unit at a second distance from the source in the travel path of the particles or rays emitted from the source, wherein the second shielding unit is configured to block at least a portion of the first type of particles or rays and allow the second type of particles or rays to traverse substantially unimpeded therethrough; obtaining a third set of data collected from the one or more detectors, wherein the third set of data corresponds to detections by the one or more detectors with the first and the second shielding units in place; estimating, based on the first, the second, and the third set of data, a shielding parameter associated with the first and the second shielding units; obtaining, based on the shielding parameter, a set of training data for the first type of particles or rays and the second type of particles or rays; and determining a classifier based on the set of training data to classify the first type of particles or rays and second type of particles or rays.

In some embodiments, the first and the second shielding units are lead blocks. In some implementations, the shielding parameter is an attenuation coefficient. In some embodiments, the particles or rays include alpha particles, fast neutrons, thermal neutrons, or gamma rays. In some implementations, the first type of particles or rays is gamma rays and the second type of particles or rays is neutrons.

In some embodiments, the classifier is a Bayesian classifier. In some implementations, the one or more detectors include 12 to 100 detectors. In some embodiments, the method further includes controlling a rate of emittance by the source to be below a predetermined threshold to reduce overlapped accumulation of the data corresponding to each type of particles or rays.

In another exemplary aspect, a system for calibrating a radiation detector is disclosed. The system includes a source configured to emit particles or rays including a first type of particles or rays and a second type of particles or rays; two shielding units, wherein each shielding unit is configured to be removably positioned in a travel path of the particles or rays that are emitted from the source at a different distance from the source, and wherein each shielding unit is configured to block at least a portion of the first type of particles or rays and to allow the second type of particles or rays to traverse substantially unimpeded therethrough; one or more detectors positioned in the travel path of the particles or rays, wherein the one or more detectors are configured to detect the first type of particles or rays and the second type of particles or rays, and to produce electronic pulses in response to the detection of the first and the second type of particles or rays; and a processor coupled to the one or more detectors, the processor further coupled to a memory including instructions executable by the processor, the instructions upon execution by the processor configure the processor to receive (1) produce a set of training data for the first type of particles or rays and the second type of particles or rays based on the electronic pulses, and (2) obtain a classifier based on the set of training data to classify the first type of particles or rays and second type of particles or rays.

In some embodiments, the particles or rays include alpha particles, fast neutrons, thermal neutrons, or gamma rays. In some implementations, the one or more shielding units include one or more lead blocks. In some embodiments, the source is configured to emit the particles or rays at a rate below a predetermined threshold to reduce overlapped accumulation of the electronic pulses corresponding to each type of particles or rays.

The above and other aspects and their implementations are described in greater detail in the drawings, the description and the claims.

DETAILED DESCRIPTION

In this patent document, the term "exemplary" is used to mean "an example of" and, unless otherwise stated, does not imply an ideal or preferred embodiment. The word "particle" and the word "ray" may also be used interchangeably.

Figure 1:
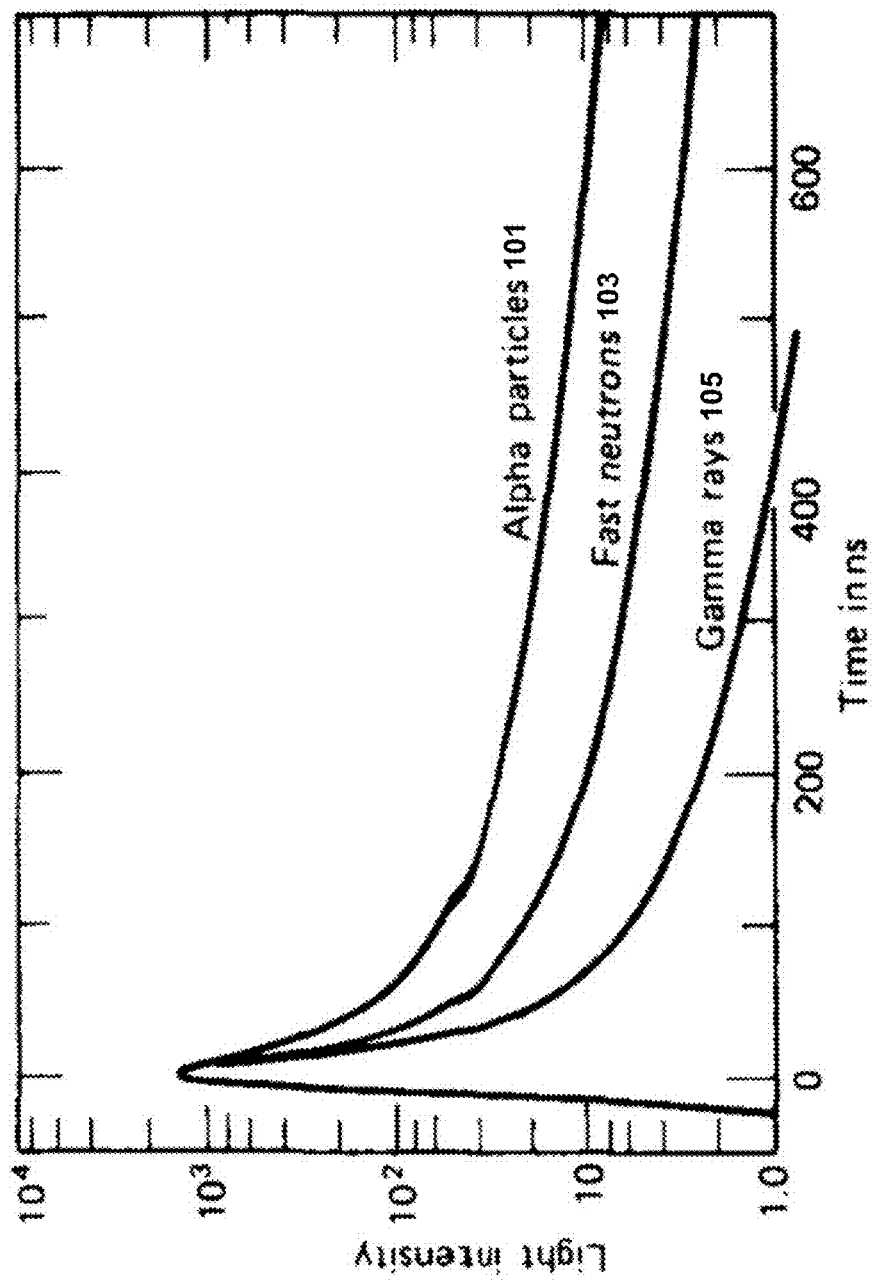
FIG. 1 shows exemplary pulse shapes of alpha particles, fast neutrons, and gamma rays.

Pulse shape discrimination (PSD) is one method for identifying different particles using a particle detector. When particles interact with the detector materials, they often produce different rise and fall times depending on their charge and mass, resulting in different pulse shapes. PSD and similar systems rely on small differences in pulse signatures to identify the particle and to, for example, determine whether an observed pulse comes from a neutron, a gamma ray, or an alpha particle. FIG. 1 shows some exemplary pulse shapes of alpha particles 101, fast neutrons 103, and gamma rays 105, which illustrates that different particles have different decay (i.e., tail) characteristics.

As evident from FIG. 1, the differences in tail characteristics is one way of discriminating between the particles. Identification of particles using PSD, often requires multiple sets of reference pulses (e.g., each set corresponding to a particular known particle), as well as one or more classification features (e.g., a ratio of tail-to-total energy of the pulse). The pulse shapes, however, can vary for different configurations of detectors, different environmental conditions (e.g., temperatures), different levels of background noise, and the like. Therefore, to provide a reliable detection system, the detectors are often required to be calibrated in order to account for individual variability of the detection systems, environmental conditions, and other factors that can influence the detection process. Currently, detectors that are calibrated to distinguish between gamma rays and neutrons use mainly three methods: gamma only sources, time-of-flight data, and Gaussian peak fitting. These technique, however, have several shortcomings.

Gamma only sources, as the name implies, produce only gamma rays and no neutrons. They can thus be used to build a "gamma-only" pulse profile. This "gamma-only" profile is then compared to the pulses from a gamma and neutron source. Pulses not matching the gamma-only profile are considered to be neutrons. This method can be problematic for two reasons. First, the neutron distribution is never actually assessed on its own. It is therefore difficult to assess how well a classifier is performing using this data, because no known neutrons are ever generated. Second, the gamma-only sources do not produce gamma signatures that are identical to the gamma/neutron mixture sources of interest—in reality, there is always a certain amount of contamination from other types of particles in the pulses.

The use of time-of-flight (ToF) data is the currently the gold-standard for particle differentiation, but ToF data is difficult to collect and use. ToF measurements utilize two detectors: one close to the source and one farther away. The close in detector is used to determine when a fission event occurs. Then the time between the fission event and an event at the second detector (the one farther away) is used to assess the speed of the particle, thereby classifying it. For example, if a particle travels at the speed of light, it is classified as a photon, while if it is slower it is classified as a neutron. Time-of-flight data suffers from noise from background gamma rays and neutrons, and also from possible overlap between gamma and neutron arrival times if the second detector is too close. However, if the second detector is far away, it won't pick up enough events to characterize the full neutron and gamma spaces quickly. Generating ToF data sets also requires an expert user to match fission events with particle arrivals at the second detector. This method therefore requires specialized equipment and expert knowledge, and will still generate orders of magnitude less data than a comparable detector in a real use case.

Gaussian peak fitting is performed using only measurements on fission (i.e., mixed gamma/neutron) sources but relies on very strong assumptions about the distributions of pulses. Gaussian peak fitting is typically used when looking at pulse summaries consisting of the total energy deposited and the ratio of tail energy (post-peak) to total energy. In high energy regimes, it is possible to construct tail-to-total summaries that clearly separate gamma rays from neutrons. Gaussian distributions are then fit to each peak, and signals are classified according to whether they have higher neutron or gamma likelihood. This method relies on having clear separation between neutron and gamma populations, which does not exist at low energies. It also assumes that tail/total ratios have Gaussian distributions for fixed energies, which is unlikely to be true in all cases. Moreover, this method relies on using a well-understood classification space (e.g., total, tail/total), and does not work for new and potentially better metrics that can be used to identify neutrons.

This patent document describes methods and systems that can be used on any source—not just a gamma-only source—to generate custom calibration for different types of particles from that source. The disclosed technology requires no specialized equipment or expert knowledge, which is different from the requirements of using ToF data, and can generate substantially more data for training than the ToF method. Unlike the Gaussian method, the disclosed technology does not rely on any distributional assumptions and is applicable to any classification feature space.

In addition, both gamma-only and ToF methods require a separate "classification" step after the data labeling step and before a detector can be calibrated and used. The disclosed techniques build a classifier in the process of labeling the training data, and allow the classifier to be immediately used to classify future pulses from the source.

Frameworks for Parameter Estimation

To illustrate the underlying feature of the disclosed embodiments, it is instructive to use the following model and setup. In particular, one exemplary calibration procedure includes setting up a radiation source, and directing particles emitted from the radiation source to one or more particle detectors to measure a first set of baseline data. The procedure also includes placing one shielding unit between the radiation source and the detectors to measure a second set of baseline data, and placing one more shielding unit between the radiation source and the detectors to measure a third set of baseline data. The above frame work is referred to as the two-unit framework in this document. Because the rate of neutrons and gamma rays of shielded and/or unshielded sources can easily be thousands of times the rate of background neutrons and gamma rays, for the purpose of deriving the framework for parameter estimation, background neutrons and gamma rays as well as measurement error are assumed to be negligible. The small amount of neutron capture or scattering from the shielding material is also deemed negligible.

Two-Unit Framework

Three sets of measurements are captured in the two-unit calibration process, denoted $R_{t1}$, $R_{t2}$, and $R_{t3}$. $R_{t1}$ is the baseline measurement with no additional shielding, $R_{t2}$ is the measurement with a single shielding unit, and $R_{t3}$ is the measurement with two shielding units. The rate in a particular portion of output space is denoted as $R_{ti}(x)$, where x is an output characteristic (e.g. tail to total, sampled pulse, or other types of classification features) and i is the index of the measurement. In the case of neutrons and gamma rays differentiation, the rate at which neutrons and gamma rays with the given output characteristic appear are denoted as $R_n(x)$ and $R_g(x)$ respectively. The rate can also be extended to other types of particles.

The two-unit framework is suitable for shielding materials that have a non-negligible energy specific shield parameter $\alpha(x)$. When the energy specific shielding parameter $\alpha(x)$ falls in the range of $0 \leq \alpha(x) < 1$, the rate of detection for the corresponding type of particles is reduced or attenuated by $1-\alpha(x)$. For example, for every shielding unit, the rate of gamma detection is reduced by $1-\alpha(x)$. That gives the following equations describing detection rate behavior:

$$R_{t1}(x) = R_n(x) + R_g(x) \quad \text{Eq. (1)}$$

$$R_{t2}(x) = R_n(x) + \alpha(x) R_g(x) \quad \text{Eq. (2)}$$

$$R_{t3}(x) = R_n(x) + \alpha(x)^2 R_g(x) \quad \text{Eq. (3)}$$

An estimate of the energy dependent shielding parameter $\hat{\alpha}(x)$ can be derived as:

$$\hat{\alpha}(x) = \frac{R_{t2}(x) - R_{t3}(x)}{R_{t1}(x) - R_{t2}(x)} \quad \text{Eq. (4)}$$

$\hat{\alpha}(x)$ can then be used to determine the values of $R_n(x)$ and $R_g(x)$ as follows:

$$\widehat{R_g}(x) = \frac{R_{t1}(x) - R_{t2}(x)}{1 - \hat{\alpha}(x)} \quad \text{Eq. (5)}$$

$$\widehat{R_n}(x) = R_{t1}(x) - \widehat{R_g}(x) \quad \text{Eq. (6)}$$

In some embodiments, the final estimated $\hat{\alpha}(x)$ is calculated based on a neighborhood of values rather than a specific x value. In addition, rather than a count for a particular output value, the global estimates of $R_{ti}$ will be based on nonparametric density estimates. It is noted that the estimation of the total densities does not require the estimation of the shielding parameter.

After obtaining the respective estimates, a natural Bayesian classifier between gamma rays and neutrons can be derived accordingly. For example, the Bayesian classifier for neutrons can be defined the same way as shown in Eq. (5).

Similar to the one-unit framework, in some embodiments, in one example embodiment, the Bayesian classifier uses a cutoff of 0.5 to minimize misclassification. The value, however, can be selected or adjusted by the user to reflect the relative costs of false positives and negatives. This kind of classifier gives both the classification of any given pulse as well as the confidence in that classification. For example, two pulses with Pr(n|x1)=0.6 and Pr(n|x2)=0.999 will both have the same classification, but the confidence is much higher in the second case.

Generalization of the Two-Unit Framework

The relative attenuation relationships for different amounts of material are given by:

$$I = I_0 e^{-\mu l} \quad \text{Eq. (7)}$$

Here, I is the intensity of light passing through the shielding unit, $I_0$ is the initial intensity, $\mu$ is an energy and material specific attenuation factor, and l is the length of the material that particles are passing through. The factor $\alpha(x)$ described above is the transmittance ($T = e^{-\mu l}$) through one unit of shielding material. The fact that the transmittance through two shielding units is $\alpha^2$ follows naturally from the formula, but the relation can be extended to the more general case for shielding of varying widths and/or thicknesses. For example, in some embodiments, the shielding units have different thicknesses (i.e., the first shielding has a first known thickness, and the second shielding has a second known thickness). In some embodiments, the shielding units may include different types of materials with different $\alpha$ values.

Similarly, measurements may be taken for varying lengths of time if needed, so long as the time for each measurement is known. The disclosed method relies on a known differential decrease rather than a characteristic that is specific to gamma rays and/or neutrons. This method can therefore be used for other signaling problems where there is a known differential in response to shielding, distance, or other detection factors under the operator's control.

Depending on the shielding properties of the shielding units, the two-unit framework can be further extended to other multi-unit frameworks so as to obtain an estimate of $\alpha$ and the corresponding $\widehat{R_n}(x)$ and $\widehat{R_g}(x)$ using a similar approach as illustrated in Eq. (2) to Eq. (6).

Exemplary Calibration Setup

Figure 2:
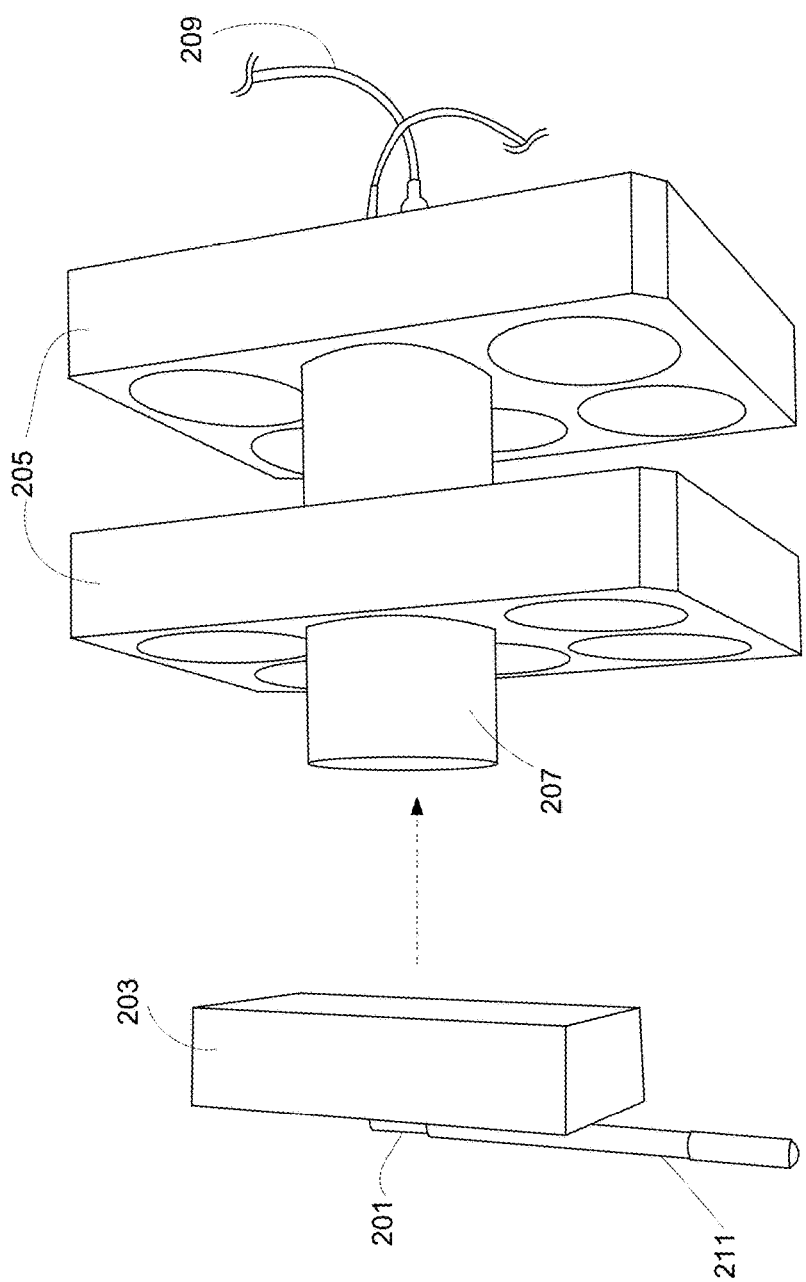
FIG. 2 shows an exemplary calibration setup that uses one shielding unit.

FIG. 2 shows an exemplary calibration setup that uses one shielding unit. In this setup, a radiation source 201 is positioned behind a shielding unit 203, e.g., a lead brick. The depicted radiation source 201 is formed as an end part of a rod that includes a handle 211 to facilitate placement of the source. It is, however, understood that the source 201 may be positioned using other configurations. The radiation source 201 may include fissioning materials such as Cf-252. In the exemplary setup of FIG. 2, a two-piece holder comprising holders 205 holding one or more particle detectors 207 in approximate alignment to receive the particles from the radiation source 201. The particle detector 207 may be housed in an enclosure (e.g., a cylindrical enclosure, as shown). The particle detector 207 includes detector material such as EJ-309, EJ-301, anthracene, stilbene, EJ-299-33A, EJ-299-34, CLYC, etc. that interacts with the particles received from the radiation source. For example, the detector material can be doped with $^6$Li to interact with incoming neutrons. In one example, the particle detector is coupled to a photomultiplier tube that produces an electrical signal in response to the detection of photons produced due to the interaction of the particles with the material of the detector. The particle detector 207 is capable of converting light/radiation into electronic pulses that have different shapes. In some embodiments, an array of 12 to 100 particle detectors 207 can be arranged with multiple holders 205 to detect the particles. Wires 209 are connected to one end of the one or more detectors 207 to transmit the electronic pulses to a processing unit (not shown) so that data can be collected and processed. The processing unit may be implemented by a processor and a memory that stores processor-executable instructions. The processor then executes the stored instructions to process the incoming electronic pulses and store corresponding results.

The radiation source 201 emits radiation, e.g., both neutrons and gamma rays. A part of the emitted radiation is absorbed by a shielding unit 203, while a remaining portion goes through the shielding unit 203 largely unimpeded. For example, gamma rays are absorbed by the shielding unit while neutrons can go through unimpeded. The remaining particles, e.g., neutrons, are received by the particle detector 207 and generate flashes of light within the detector 207. The flashes of light are then captured and converted to electronic pulses.

During the calibration process, it is desirable to maintain the relative positions of all components. For example, it is desirable to maintain the distance between the radiation source 201 and the detector 207. It is also desirable to keep a constant distance between the radiation source 201 and the shielding unit 203 during measurement. Based on the framework to be adopted (e.g., a two-unit framework), the operator needs to take multiple of measurements. For example, the following measurements are taken: 1) baseline configuration, 2) baseline plus one shielding unit, and 3) baseline plus two shielding units.

It is also desirable to take all measurements for substantially the same period of time so that data collected in the various periods of time can generate a sufficiently high confidence in the rate of production of pulses with various characteristics. For example, the traditional tail and tail/total setup requires enough pulses to generate density estimates for the full tail and tail/total space. It is also noted that the pulses need to have a good amount of tail sections to allow proper differentiation of particles. If the particles come into the detector too quickly, the resulting pulse shapes may have little tail sections and "pile up" together. The "pile-up" phenomenon can cause difficulty in particle characterization, therefore it is important to control the calibration process so that the ratio of "pile-up" events is below a predetermined threshold. For example, for radiation pulses being around 1 microsecond each, the calibration process can be controlled to ensure that only 10,000 events per second occur in order to keep the "pile-up" rate at around or below 1%.

In embodiments that use the two-unit framework, three sets of measurements can be collected from a radiating source, e.g., a Cf-252 sample. In some embodiments, the shielding units are each one inches thick and are made of lead. In one example, the measurements are collected at one or more particle detectors with a distance of around 10 cm from the radiation source. Depending on the strength of the source, the distance can be used to control the detection rate for an acceptable collection time period, and at or below acceptable pileup rate. For example, data for each measurement (i.e., no shielding unit, one shielding unit, and two shielding units) may be collected for a collection time period of 10 minutes.

In some example configurations, the measurement sets can include 2.1 million to 5.6 million pulses depending on the level of shielding. In some embodiments, the classification features are (1) total energy, which is calculated as the area under the curve for a median subtracted measurement, and (2) tail/total, where the tail is the area under the same curve as total energy but starts three time steps after the observed pulse peak. The procedure disclosed herein, however, is not limited to these features and can be extended to new types of features as deemed suitable.

Figure 3:
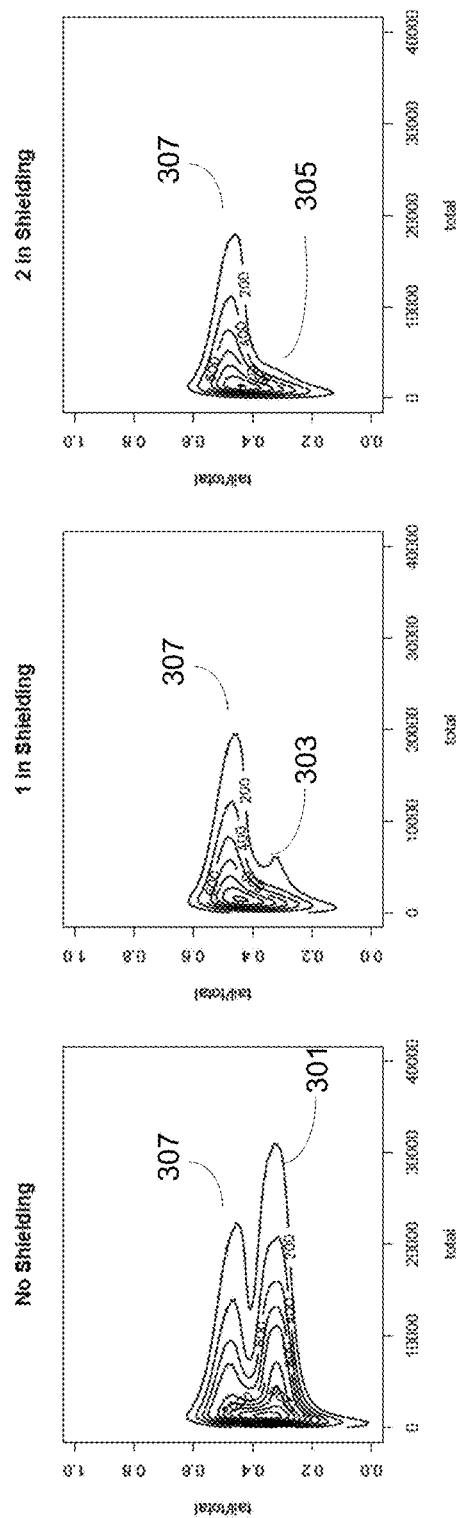
FIG. 3 shows exemplary contour plots for each estimate under no shielding, one-inch shielding, and two-inch shielding.

As an initial step, density estimation can be performed for each dataset using, for example, two-dimensional kernel density estimation. The results then can be scaled to integrate to the total number of observed counts for each measurement condition, giving estimates for $R_{t1}$ (unshielded), $R_{t2}$ (one-inch shielding with one shielding unit), and $R_{t3}$ (two-inch shielding with two shielding units). FIG. 3 shows exemplary contour plots for each estimate. The sharp drop, 301, 303, and 305 in the low tail/total region over the three measurements, corresponds to decreasing gamma counts due to shielding. The upper lobe 307, which is primarily neutron signal, does not change substantially.

Figure 4:
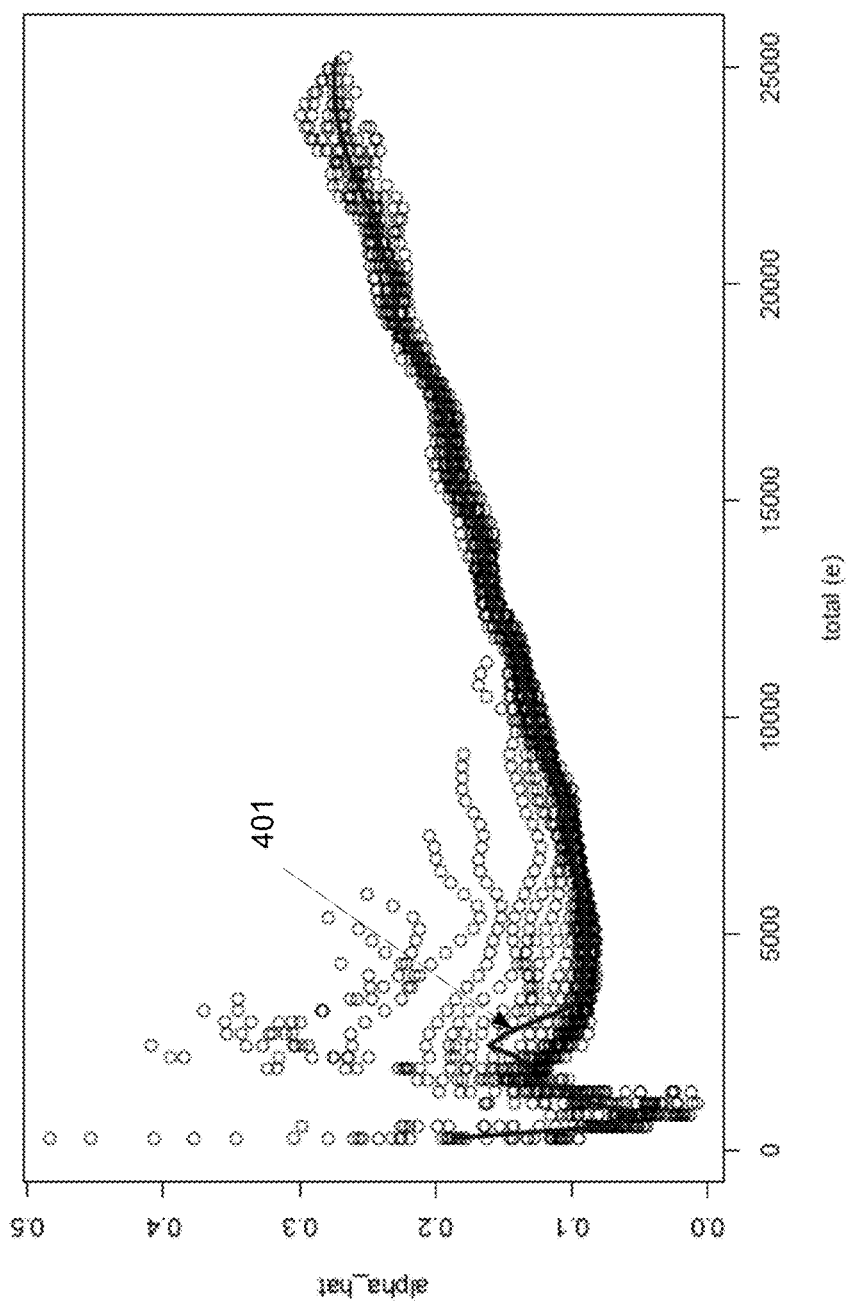
FIG. 4 shows an exemplary scatterplot of $\hat{\alpha}$ estimates for various for various total energies.

One problem with the alpha estimator in the two-unit framework (shown in Eq. (9)) is that it is undefined in regions where there is no decrease in counts between unshielded and shielded measurements. Thus, the estimator may not distinguish between regions where the transmittance is one and where there are no gamma rays to start with. Since it is known that transmittance changes with the gamma energy, and that energy deposited in the detector is related to gamma energy, $\alpha$ can be restricted to vary only as a function of total measured pulse energy e, giving $\hat{\alpha}(e)$. To avoid the estimability problem, only regions where the scaled estimate change was large (e.g., $R_{t1}-R_{t2} \geq 200$) may be considered for the estimation of a. For grid points meeting this criterion, $\hat{\alpha}$ can be calculated according to Eq. (9). The strong nonlinear signal corresponds to high gamma regions, while much of the scatter between energies of 2,500 and 7,000 correspond to relatively low gamma, and therefore, unreliable regions. The locally weighted scatterplot smoothing (LOWESS) fit to these points was used as the final energy dependent estimate of $\hat{\alpha}(e)$, with a linear fit used to calculate values beyond the observed energy extremes. FIG. 4 shows an exemplary scatterplot of $\hat{\alpha}$ results. The final estimate of $\hat{\alpha}(e)$ is shown as the LOWESS fit 401.

Figure 5:
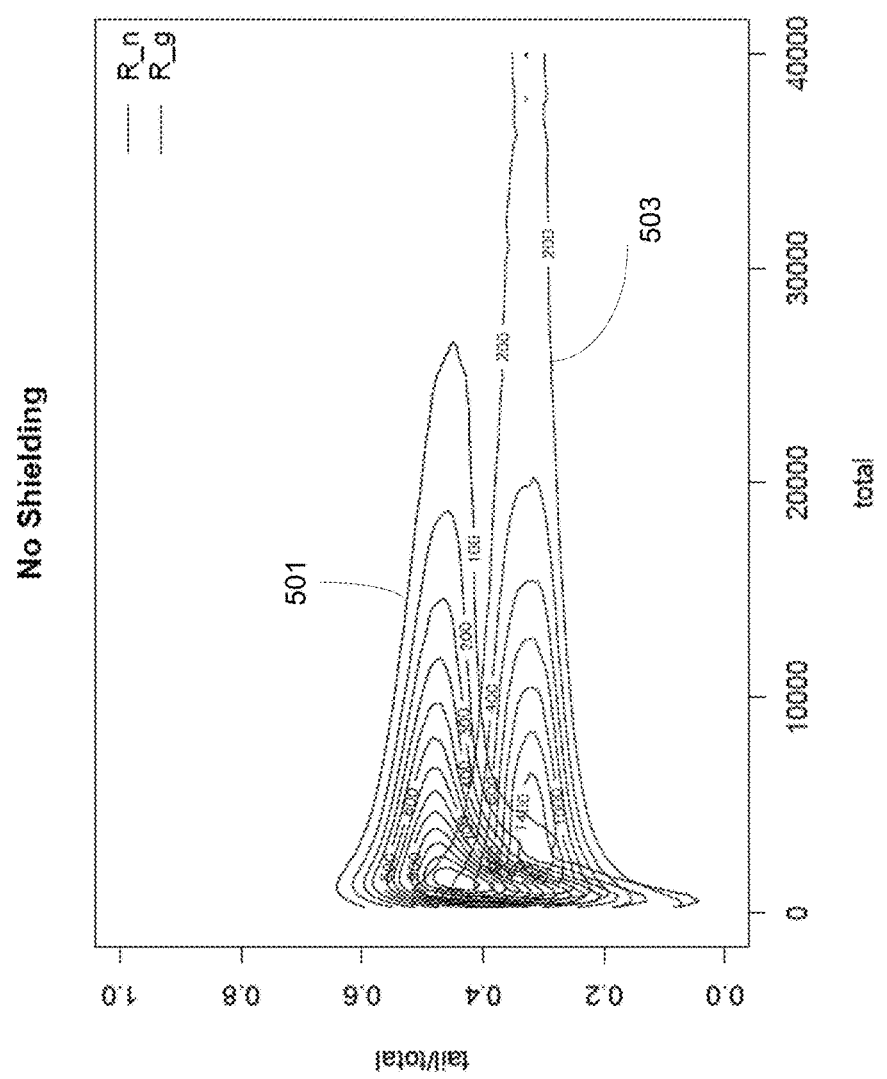
FIG. 5 shows exemplary $\widehat{R_n}(x)$ and $\widehat{R_g}(x)$ estimates generated using the two-unit framework.

This estimate of a can then be used to estimate $R_g$ and $R_n$ according to Eq. (10) and Eq. (11). FIG. 5 shows exemplary $\widehat{R_n}(x)$ and $\widehat{R_g}(x)$ estimates generated using the two-unit framework. The estimates are calculated with corrections to prevent negative values. In particular, $\widehat{R_n}(x)$ is identified using reference number 501, and $\widehat{R_g}(x)$ using reference number 503.

Figure 6:
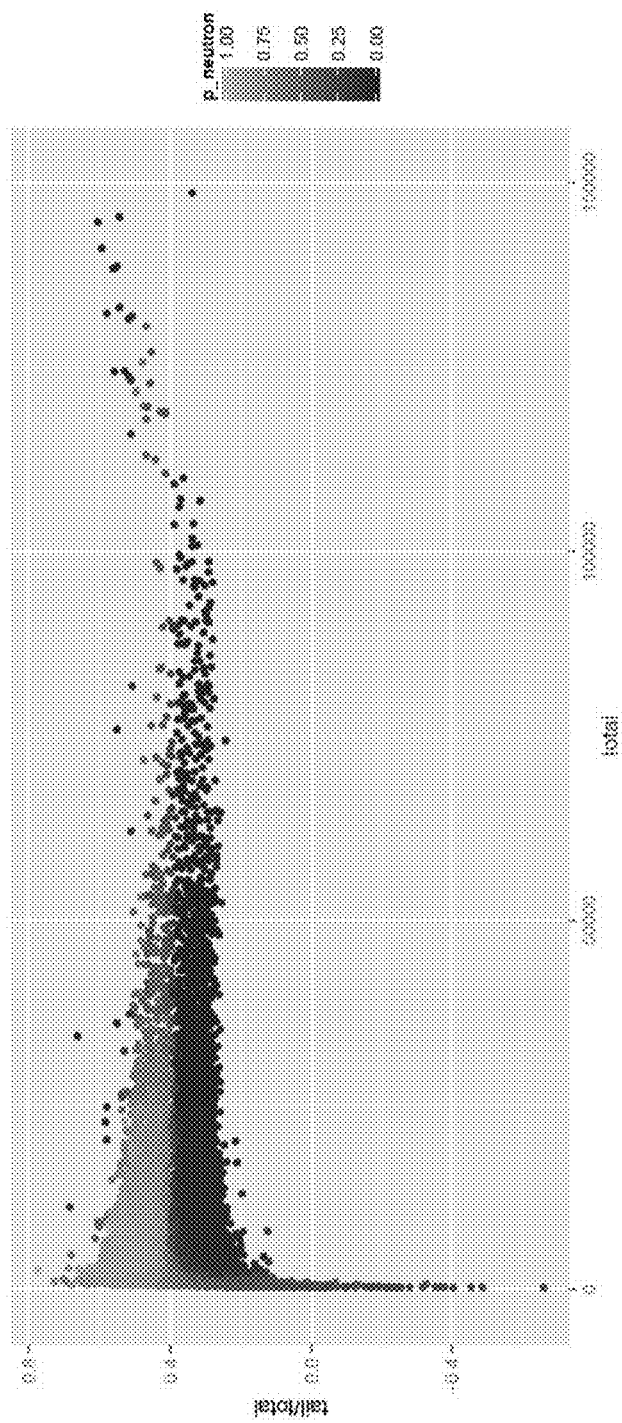
FIG. 6 shows an exemplary classification of 10,000 observed signals using the two-unit framework.

These density estimates are then used to estimate Pr(n|x) according to Eq. (5) for 10,000 points from the unshielded data set. FIG. 6 shows the resulting classification of 10,000 points using Pr(n|x) based on $\widehat{R_n}(x)$ and $\widehat{R_g}(x)$. The result resembles what has been observed in more traditionally labeled tail-to-total classification plots, such as plots obtained using ToF data. The disclosed method, however, does not require direct labeling of any observed signals. It is noted that the classification is nonlinear, and that points in sparse regions of the space are typically classified as gamma rays due to the predominance of gamma rays expected under the unshielded experimental condition. Separation between gamma rays and neutrons in low energy regions may be imperfect with tail-to-total style classification.

It is also noted that the photomultiplier tubes in the detectors can be sensitive to the operating conditions, such as temperature. When the operating conditions change, unlike the use of ToF data, the calibration method disclosed herein allows simple re-calibrations of the detectors without moving the detectors around, thereby providing more precision in the final classifications.

Figure 7:
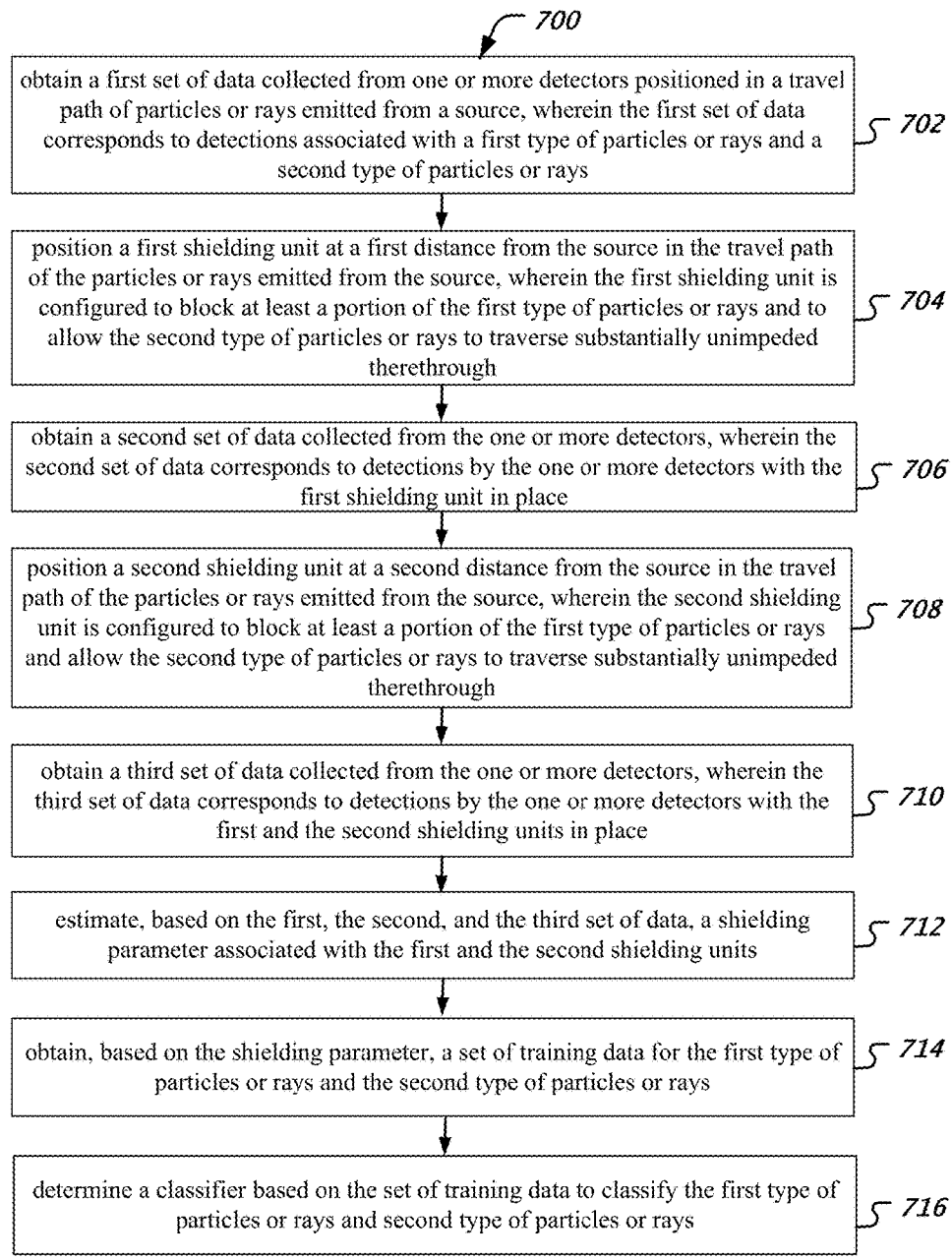
FIG. 7 is a flowchart representation of a method of calibrating a particle detector.

FIG. 7 is a flowchart representation of a method of calibrating a particle detector 700 in accordance with an exemplary embodiment. The method includes, at 702, obtaining a first set of data collected from one or more detectors positioned in a travel path of particles or rays emitted from a source, wherein the first set of data corresponds to detections associated with a first type of particles or rays and a second type of particles or rays; at 704, positioning a first shielding unit at a first distance from the source in the travel path of the particles or rays emitted from the source, wherein the first shielding unit is configured to block at least a portion of the first type of particles or rays and to allow the second type of particles or rays to traverse substantially unimpeded therethrough; at 706, obtaining a second set of data collected from the one or more detectors, wherein the second set of data corresponds to detections by the one or more detectors with the first shielding unit in place; at 708, positioning a second shielding unit at a second distance from the source in the travel path of the particles or rays emitted from the source, wherein the second shielding unit is configured to block at least a portion of the first type of particles or rays and allow the second type of particles or rays to traverse substantially unimpeded therethrough; at 710, obtaining a third set of data collected from the one or more detectors, wherein the third set of data corresponds to detections by the one or more detectors with the first and the second shielding units in place; at 712, estimating, based on the first, the second, and the third set of data, a shielding parameter associated with the first and the second shielding units; at 714, obtaining, based on the shielding parameter, a set of training data for the first type of particles or rays and the second type of particles or rays; and, at 716, determining a classifier based on the set of training data to classify the first type of particles or rays and second type of particles or rays.

The shielding units, e.g., lead blocks, can easily be obtained at a low cost, so the calibration procedure disclosed herein is cheap to perform. Unlike the gamma-only source method, the disclosed procedure does not impose any limitation on the radiation source. In fact, the procedure can be used on any source to generate custom calibration for different types of particles from that source. Unlike the ToF data method, the disclosed procedure requires no specialized equipment or expert knowledge, and can generate substantially more data for training than the ToF method. Unlike the Gaussian peak fitting method, the disclosed procedure is not limited to well-understood classification space. It can be extended to various types of metrics (e.g., the sample pulses themselves) to identify the particles. Furthermore, using the disclosed procedure, a classifier can be obtained simultaneously with the training data during the processing stage, eliminating the need of a separate classification step. The accuracy of the disclosed procedure is similar to what has been observed in more traditionally labeled tail-to-total classification methods (in particular, the ToF data method).

Another advantage of the disclosed technology is portability of the calibration setup and ease of use. In particular, when a new calibration run is needed due to, for example, a change in environmental conditions, there is no need to move the detectors to other locations to perform the calibration. The operator of the detectors can simply repeat the calibration process by utilizing the source and sequentially placing two shielding units between the source and the detectors to collect three sets of data for processing. The disclosed techniques, therefore, allow simple and fast in-situ calibration of the detectors.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for calibrating a radiation detector, comprising:
   a source configured to emit particles or rays including a first type of particles or rays and a second type of particles or rays;
   a first and a second shielding unit, the first shielding unit configured to be removably positioned at a first distance from the source in a travel path of the particles or rays that are emitted from the source and the second shielding unit configured to be removably positioned at a second distance from the source in the travel path of the particles or rays that are emitted from the source, each shielding unit configured to block at least a portion of the first type of particles or rays and to allow the second type of particles or rays to traverse substantially unimpeded therethrough;
   one or more detectors positioned in the travel path of the particles or rays to receive one or more particles or rays, wherein the one or more detectors are configured to detect the first type of particles or rays and the second type of particles or rays and to produce electronic pulses in response to the detection of the first and the second type of particles or rays; and
   a processor coupled to the one or more detectors, the processor further coupled to a memory including instructions executable by the processor, the instructions executable by the processor to configure the processor to receive (1) a first set of pulses from the one or more detectors corresponding to detections with the first and the second shielding units in place, (2) a second set of pulses from the one or more detectors corresponding to detections with the first shielding unit in place and with the second shielding unit removed, and (3) a third set of pulses from the one or more detectors corresponding to detections with both the first and the second shielding units removed, the processor further configured to store at least a first set of training pulses corresponding to the first type of particles or rays and a second set of training pulses corresponding to the second type of particles or rays, and to generate a classifier that allows classification of the first and the second types of particles or rays.

2. The system of claim 1, wherein the particles or rays include alpha particles, fast neutrons, thermal neutrons, or gamma rays.

3. The system of claim 1, wherein the first type of particles or rays includes gamma rays and the second type of particles or rays includes neutrons.

4. The system of claim 1, wherein the first and the second shielding units are lead blocks.

5. The system of claim 4, wherein the lead blocks have a thickness of 2 inches.

6. The system of claim 1, wherein the classifier is a Bayesian classifier.

7. The system of claim 1, including 12 to 100 detectors.

8. The system of claim 1, wherein the source is configured to emit the particles or rays at a rate below a predetermined threshold to reduce overlapped accumulation of the electronic pulses corresponding to each type of particles or rays.

9. A method of calibrating a radiation detector, comprising:
   obtaining a first set of data collected from one or more detectors positioned in a travel path of particles or rays emitted from a source, wherein the first set of data corresponds to detections associated with a first type of particles or rays and a second type of particles or rays;
   positioning a first shielding unit at a first distance from the source in the travel path of the particles or rays emitted from the source, wherein the first shielding unit is configured to block at least a portion of the first type of particles or rays and to allow the second type of particles or rays to traverse substantially unimpeded therethrough;
   obtaining a second set of data collected from the one or more detectors, wherein the second set of data corresponds to detections by the one or more detectors with the first shielding unit in place;
   positioning a second shielding unit at a second distance from the source in the travel path of the particles or rays emitted from the source, wherein the second shielding unit is configured to block at least a portion of the first type of particles or rays and allow the second type of particles or rays to traverse substantially unimpeded therethrough;
   obtaining a third set of data collected from the one or more detectors, wherein the third set of data corresponds to detections by the one or more detectors with the first and the second shielding units in place;

estimating, based on the first, the second, and the third set of data, a shielding parameter associated with the first and the second shielding units;

obtaining, based on the shielding parameter, a set of training data for the first type of particles or rays and the second type of particles or rays; and determining a classifier based on the set of training data to classify the first type of particles or rays and the second type of particles or rays.

10. The method of claim 9, wherein the first and the second shielding units are lead blocks with identical thicknesses.

11. The method of claim 9, wherein the shielding parameter is an attenuation coefficient.

12. The method of claim 9, wherein the particles or rays include alpha particles, fast neutrons, thermal neutrons, or gamma rays.

13. The method of claim 9, wherein the first type of particles or rays is gamma rays and the second type of particles or rays is neutrons.

14. The method of claim 9, wherein the classifier is a Bayesian classifier.

15. The method of claim 9, wherein the one or more detectors include 12 to 100 detectors.

16. The method of claim 9, further comprising:

controlling a rate of emittance by the source to be below a predetermined threshold to reduce overlapped accumulation of the data corresponding to each type of particles or rays.

17. A system for calibrating a radiation detector, comprising:

a source configured to emit particles or rays including a first type of particles or rays and a second type of particles or rays;

two shielding units, wherein each shielding unit is configured to be removably positioned in a travel path of the particles or rays that are emitted from the source at a different distance from the source, and wherein each shielding unit is configured to block at least a portion of the first type of particles or rays and to allow the second type of particles or rays to traverse substantially unimpeded therethrough;

one or more detectors positioned in the travel path of the particles or rays, wherein the one or more detectors are configured to detect the first type of particles or rays and the second type of particles or rays, and to produce electronic pulses in response to the detection of the first and the second type of particles or rays; and a processor coupled to the one or more detectors, the processor further coupled to a memory including instructions executable by the processor, the instructions upon execution by the processor configure the processor to (1) receive a set of training data for the first type of particles or rays and the second type of particles or rays based on the electronic pulses, and (2) obtain a classifier based on the set of training data to classify the first type of particles or rays and second type of particles or rays.

18. The system of claim 17, wherein the particles or rays include alpha particles, fast neutrons, thermal neutrons, or gamma rays.

19. The system of claim 17, wherein the one or more shielding units include one or more lead blocks.

20. The system of claim 17, wherein the source is configured to emit the particles or rays at a rate below a predetermined threshold to reduce overlapped accumulation of the electronic pulses corresponding to each type of particles or rays.

* * * * *